Dec. 17, 1929.  S. W. ALBRIGHT  1,740,137
RETROGRADE MOVEMENT BRAKING DEVICE FOR MOTOR VEHICLES
Filed Nov. 16, 1928
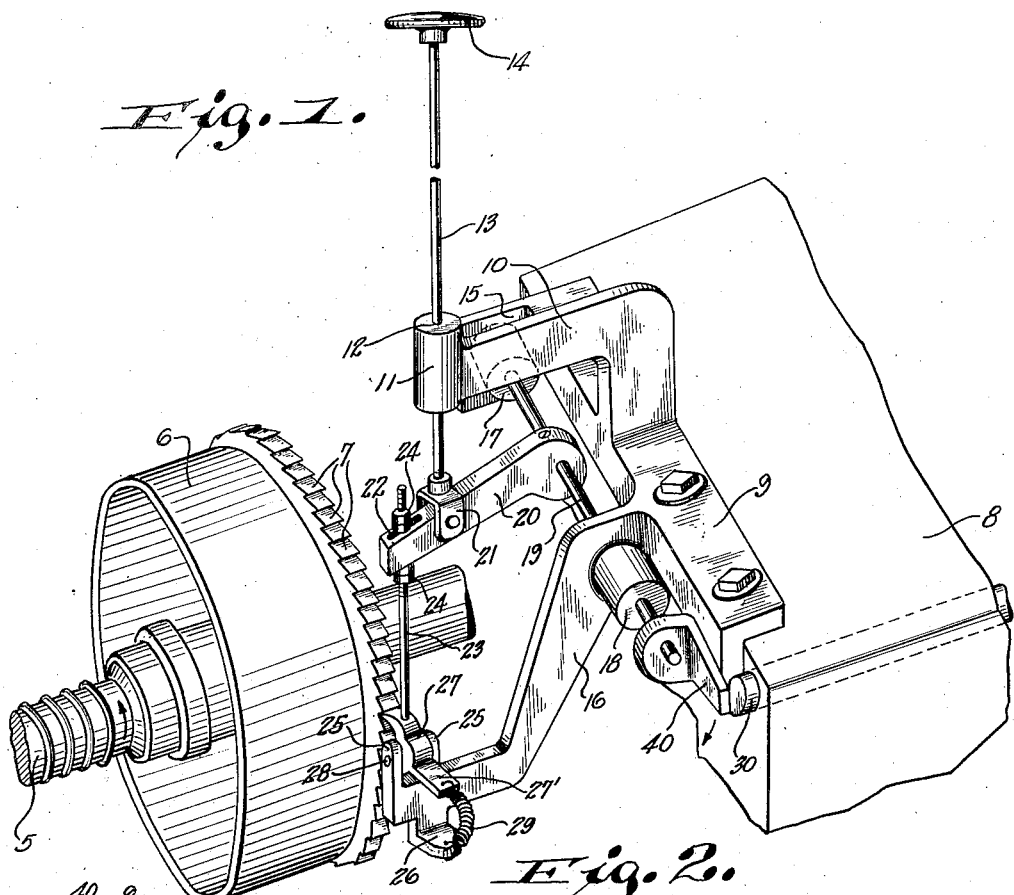
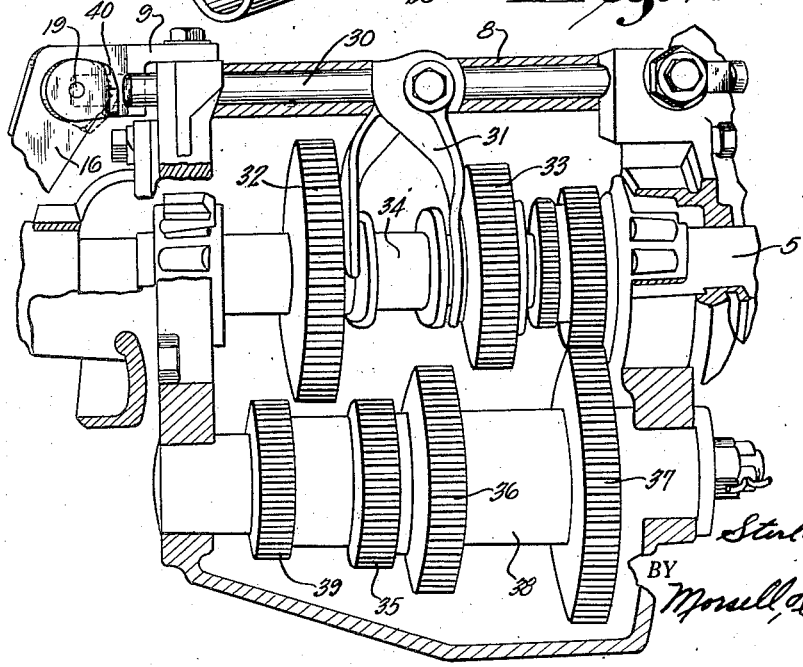
INVENTOR.
Sterling W. Albright
BY
Morsell, Feeney & Morsell
ATTORNEYS.

Patented Dec. 17, 1929

1,740,137

UNITED STATES PATENT OFFICE

STERLING W. ALBRIGHT, OF RACINE, WISCONSIN

RETROGRADE-MOVEMENT BRAKING DEVICE FOR MOTOR VEHICLES

Application filed November 16, 1928. Serial No. 319,860.

This invention relates to improvements in retrograde movement braking devices for motor vehicles.

It is the primary object of the present invention to provide a braking device for motor vehicles which will lock the vehicle against rearward coasting movement, as when the vehicle is brought to a stop while traveling up a grade or incline.

A further object of the invention is to provide a motor vehicle retrograde movement braking device mounted on the transmission of the vehicle directly below the operator's seat whereby complicated control arrangements are eliminated and a single control lever may be extended directly upwardly to the operator's position.

A further object of the invention is to provide a braking device of the class described which when in its "set" or braking position will prevent movement of the vehicle gear shift shaft so that the vehicle gears can not, unless the braking device is released, be shifted to reverse, whereby possibility of stripping the gears is eliminated.

A further object of the invention is to provide a braking device of the class described with which any motor vehicle may be readily and inexpensively equipped without any material modification or alteration thereof.

A further object of the invention is to provide a motor vehicle retrograde movement braking device which is of very simple construction, is strong and durable, is simple and effective in operation, and is well adapted for the purposes described.

With the above and other objects in view the invention consists of the improved motor vehicle retrograde movement braking device, and its parts and combinations as set forth in the claims, and all equivalents thereof.

In the accompanying drawing in which the same reference characters indicate the same parts in both views:

Fig. 1 is a perspective view of the improved retrograde movement braking device mounted on a portion of a motor vehicle; and Fig. 2 is a perspective view in vertical section of a portion of a vehicle transmission and an associated portion of the braking device.

Referring now more particularly to the drawing, it will appear that the numeral 5 indicates the drive shaft of a motor vehicle having thereon a transmission brake drum 6 and the periphery of said brake drum is formed with a plurality of ratchet teeth 7.

The frame portion of a motor vehicle adjacent the transmission is indicated by the numeral 8 and a bracket 9 is bolted thereto. Said bracket is formed with an upwardly and forwardly projecting arm 10 formed at its extremity with a bearing portion 11 provided with a vertical bore 12 to slidably receive a vertical operating rod 13. The rod is formed at its upper end portion with a knob or handle 14, and in practice, said rod extends through the floor boards of the vehicle adjacent the operator's seat for convenient manipulation.

The bracket 9 is also formed with an end arm 15 and an elongated, angular, forwardly and downwardly projecting arm 16, both of which are formed with hub or boss portions 17 and 18, and a shaft 19 is journaled in said boss portions 17 and 18.

The inner end portion of a lever 20 is mounted fast on an intermediate portion of said shaft 19 and a U-shaped bracket 21 is pivotally mounted on the outer end portion of said lever and has secured fast thereto the lower end portion of the operating rod 13. The outer end portion of said lever also has extending vertically therethrough an elongated slot 22 through which the upper end portion of a ratchet or dog operating rod 23 extends, the rod being held against detachment by nuts 24 threaded thereon.

The lower outer end portion of the arm 16 is formed with a pair of spaced, upwardly projecting lugs 25 and a lower, laterally projecting lug 26. A pawl or dog 27 is pivotally mounted on a pin 28 held between the lugs 25, and a projecting end portion 27' of said dog has secured thereto an end portion of a spring 29, said spring being secured at its other end portion to said lug 26. The spring serves to yieldingly hold the dog in engagement with the ratchet teeth and disengagement of the dog from said teeth is effected by an upward pull of the rod 13 which will raise the outer end portion of the lever 20 and also pull upwardly the rod 23 and the pivotal dog pivotally secured to the lower end thereof.

An important feature of the invention resides in the provision of means for preventing the shifting of the vehicle gears into reverse when the dog 27 is in tooth engaging position. The gear shifting shaft of the vehicle is indicated by the numeral 30 and said shaft carries the usual shifter fork 31 adapted to move gears 32 and 33 on the splined shaft 34. First, second and high speed gears 35, 36 and 37 are rotatably mounted on a counter shaft 38 which also carries a reverse gear 39. Mounted fast on an end portion of the shaft 19 is an angular locking plate 40 of sufficient length to extend adjacent the rear end portion of the shifting shaft 30 and said plate is also so mounted on the shaft 19 that when said shaft is turned into the position in which the dog 27 is in tooth engaging position the broad extending portion of said plate is disposed in the position shown in Figs. 1 and 2. Hence, if it is attempted to move the shifting shaft 30 rearwardly for engaging the gear 32 with the reverse gear 39, said plate 40, engaging the end of said shaft 30, will prevent rearward movement of the same and engagement of the reverse gears, whereby there is no danger of damage being done to the gears. However, if the rod 13 is raised to release the dog 27 from the ratchet teeth, the shaft 19 will be turned, turning with it the plate 40 so as to uncover the shifting shaft 30 to permit rearward movement of it to shift the gears into reverse.

When the vehicle has been brought to a stop while traveling up a hill it is desirable to prevent rearward coasting thereof, and this is accomplished by the engagement of dog 27 with one of the ratchet teeth. This engagement will lock the drive shaft against movement in a reverse direction and thereby check undesired retrograde movement of the vehicle. To proceed forwardly it is preferable to raise the rod 13 and disengage the dog, but if this is forgotten the dog will ride over the teeth 7 in forward movement of the drive shaft in the direction indicated by the arrow in Fig. 1. But, as before noted, the gears cannot be shifted into reverse until the dog is disengaged.

Although the ratchet teeth 7 have been shown and described as being formed directly on the brake drum, a ratchet wheel or teeth may be formed on the drive shaft without departing from the spirit of the invention.

From the foregoing description it will be seen that the improved retrograde movement braking device for motor vehicles is of simple and novel construction, and is well adapted for the purposes described.

What I claim as my invention is:

1. In a vehicle having a drive shaft and shiftable reverse gears, releasable means for preventing reverse movement of said drive shaft, and means for preventing driving engagement of said reverse gears when said drive shaft reverse movement preventing means is in operative position.

2. In a vehicle having a drive shaft and a gear shifting shaft, releasable braking means for holding said drive shaft against undriven reverse movement, means for holding said shifting shaft against movement in one direction, and means for simultaneously moving said braking means and said shaft holding means to inoperative positions.

3. The combination with the transmission of a motor vehicle including reverse driving gears, of releasable braking means for preventing reverse undriven movement of said transmission, means connected therewith for preventing engagement of said reverse gears when said braking means is in operative position, and a control member extending vertically above said transmission for simultaneously moving said braking means and said reverse gears engagement preventing means into and out of operative positions.

4. In a motor vehicle having a drive shaft and a gear shifting shaft, a ratchet wheel mounted fast directly on said drive shaft, a yielding pivotal dog releasably engaging said ratchet wheel, a revolubly mounted shaft, a lever fast on said shaft, a connection between said lever and said dog, an operating rod connected to said lever, and a locking plate mounted fast on said revoluble shaft and extending, when said shaft is in a turned position to effect an engagement of said dog, adjacent an end of said gear shifting shaft to prevent movement of the same in one direction.

In testimony whereof, I affix my signature.

STERLING W. ALBRIGHT.